(No Model.) 8 Sheets—Sheet 1.
G. A. BRACHHAUSEN.
AUTOMATIC MUSICAL INSTRUMENT.
No. 596,393. Patented Dec. 28, 1897.
Fig. 1,
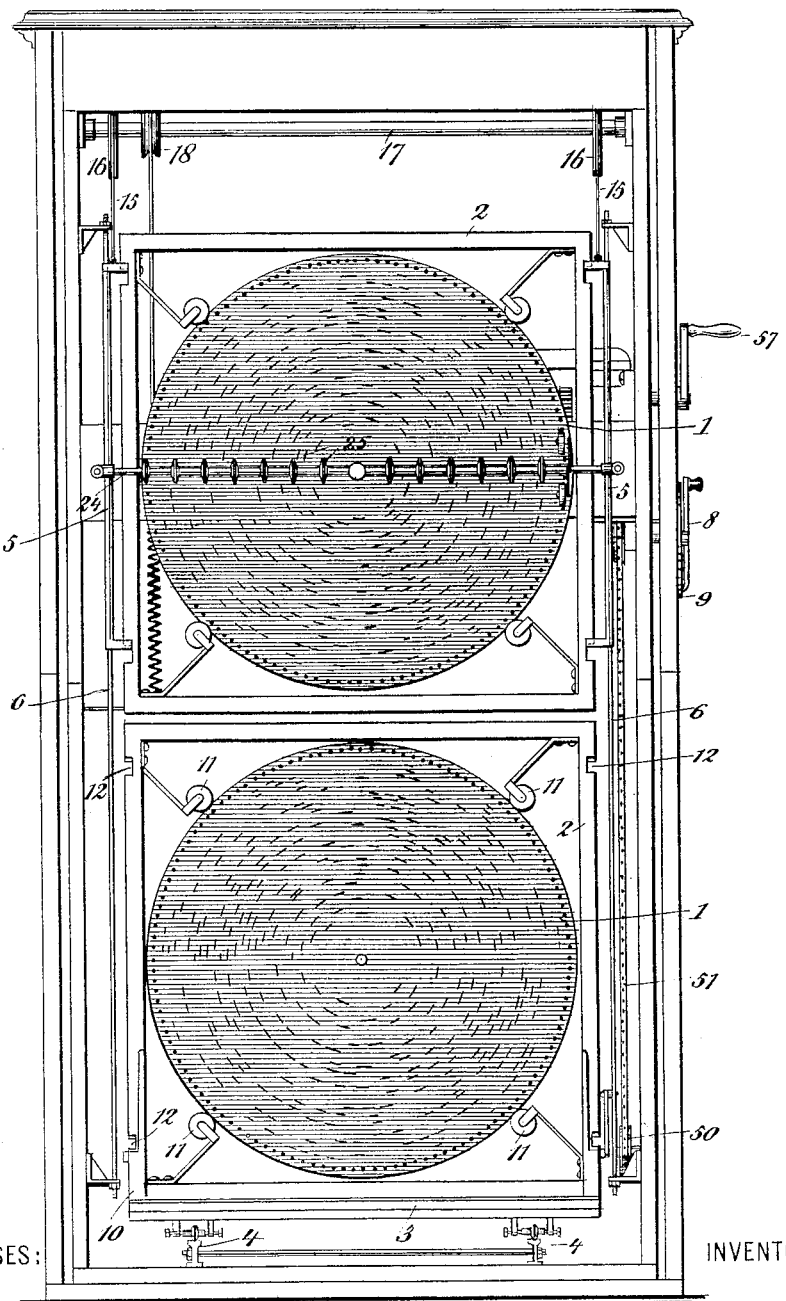
WITNESSES: INVENTOR
Gustav A. Brachhausen
BY
Briesen & Knauth
ATTORNEYS

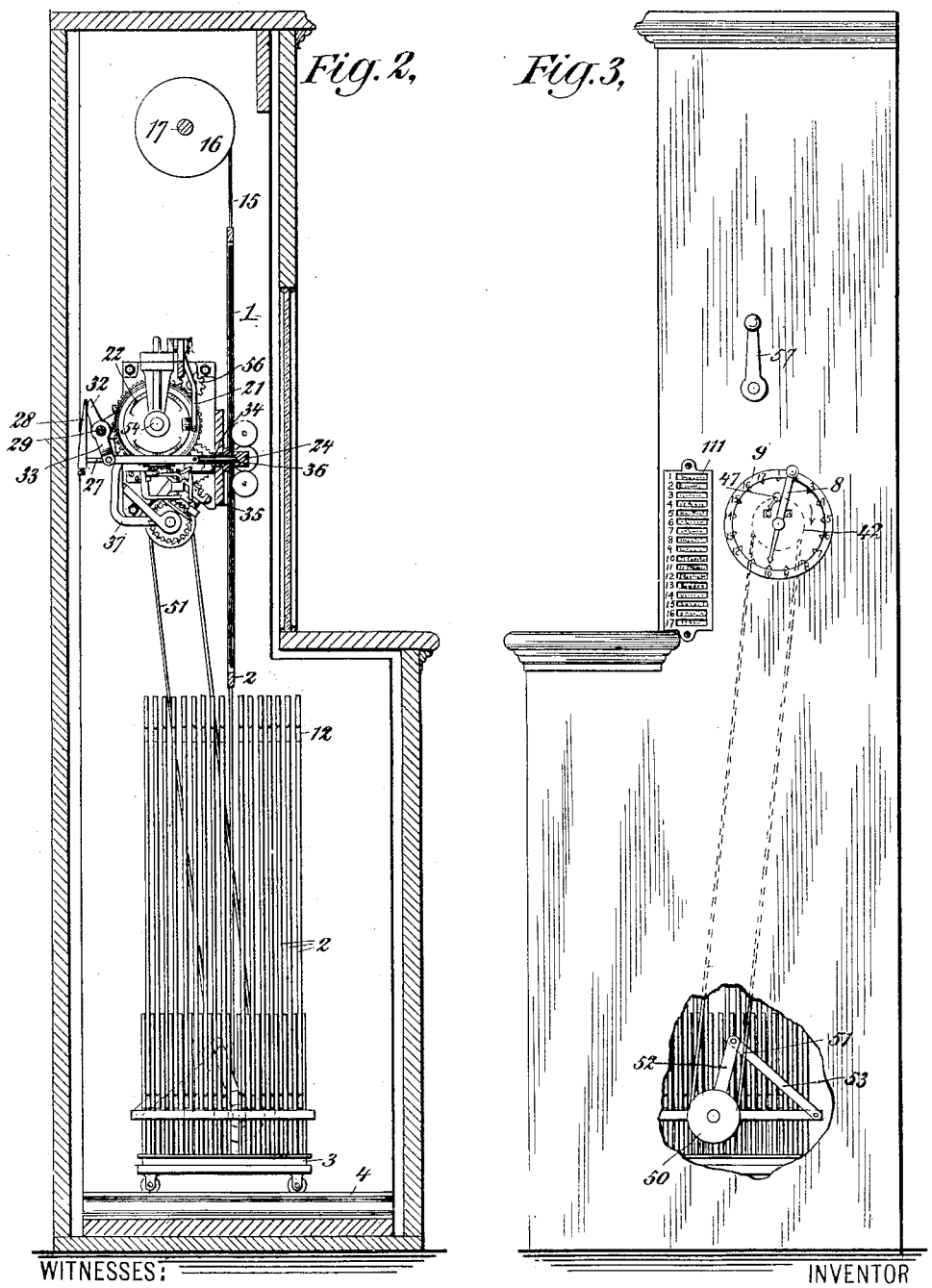

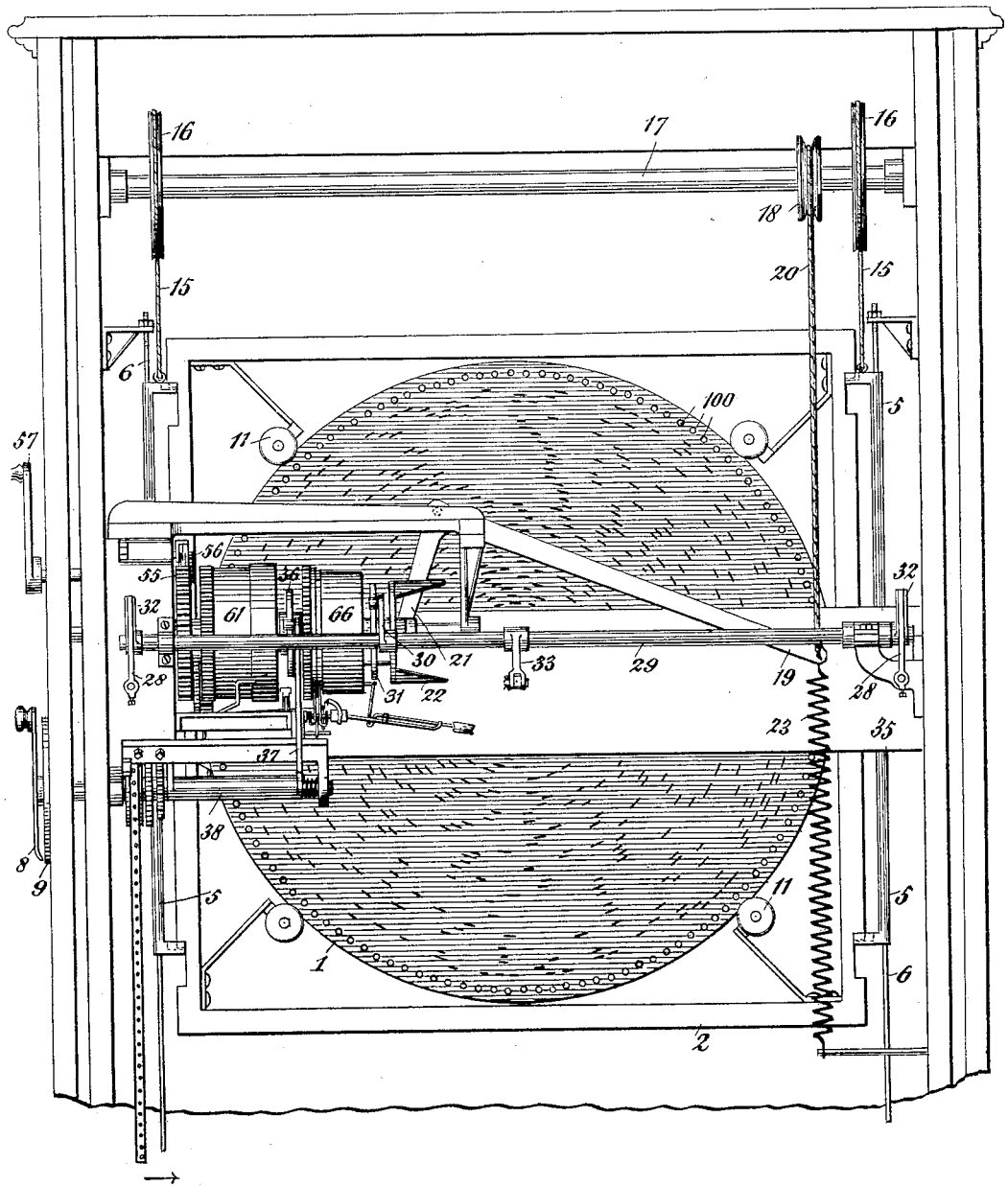

(No Model.) 8 Sheets—Sheet 4.
G. A. BRACHHAUSEN.
AUTOMATIC MUSICAL INSTRUMENT.
No. 596,393. Patented Dec. 28, 1897.
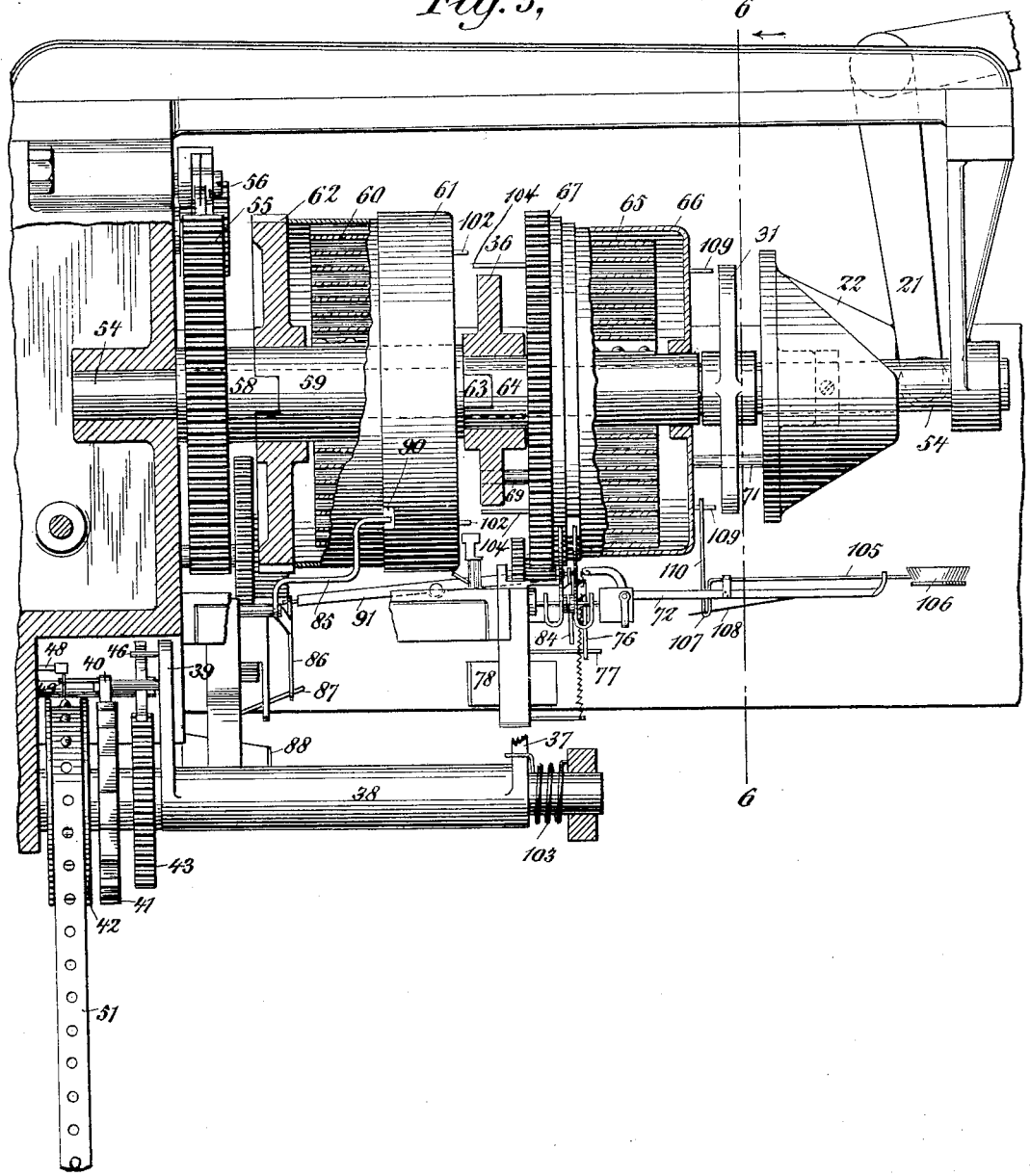
Fig. 5,
WITNESSES:
D. H. Haywood
Charles E. Smith
INVENTOR
Gustav A. Brachhausen
BY Briesen Knauth
ATTORNEYS.
THE NORRIS PETERS CO., PHOTO-LITHO., WASHINGTON, D. C.

(No Model.) 8 Sheets—Sheet 5.
G. A. BRACHHAUSEN.
AUTOMATIC MUSICAL INSTRUMENT.
No. 596,393. Patented Dec. 28, 1897.
Fig. 6,
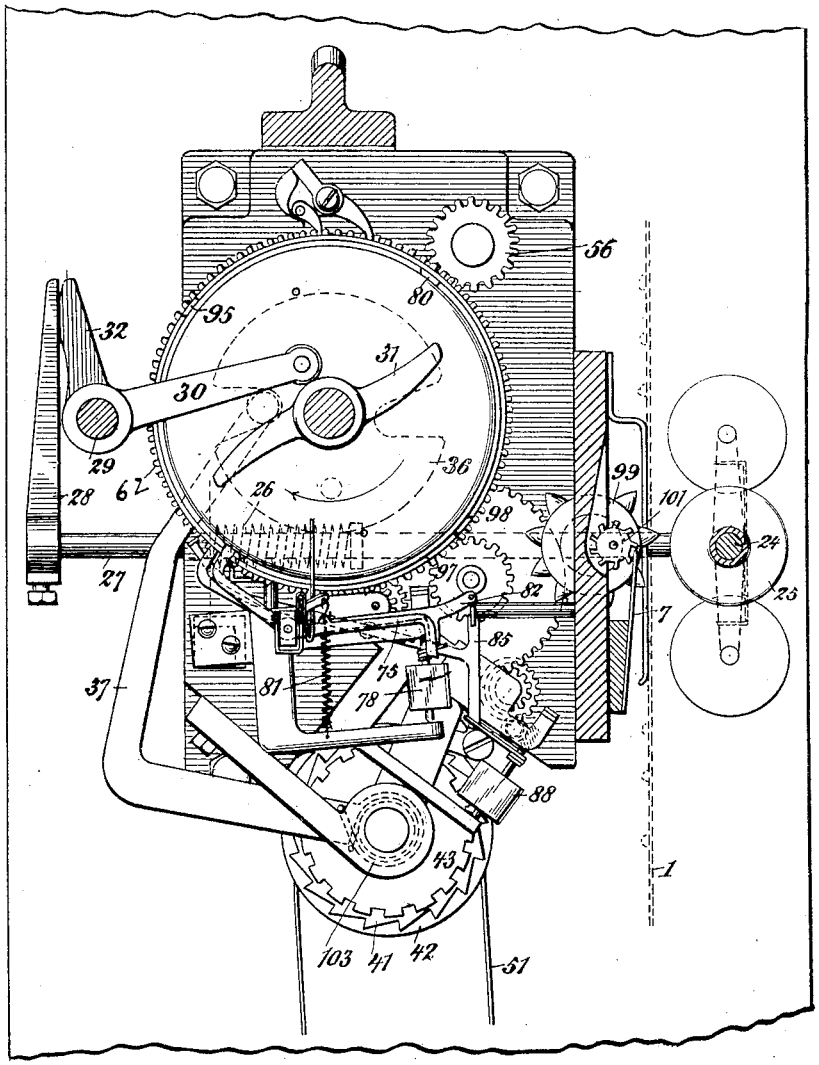
WITNESSES:
INVENTOR
Gustav A. Brachhausen
BY
ATTORNEYS.

(No Model.) 8 Sheets—Sheet 6.
G. A. BRACHHAUSEN.
AUTOMATIC MUSICAL INSTRUMENT.
No. 596,393. Patented Dec. 28, 1897.
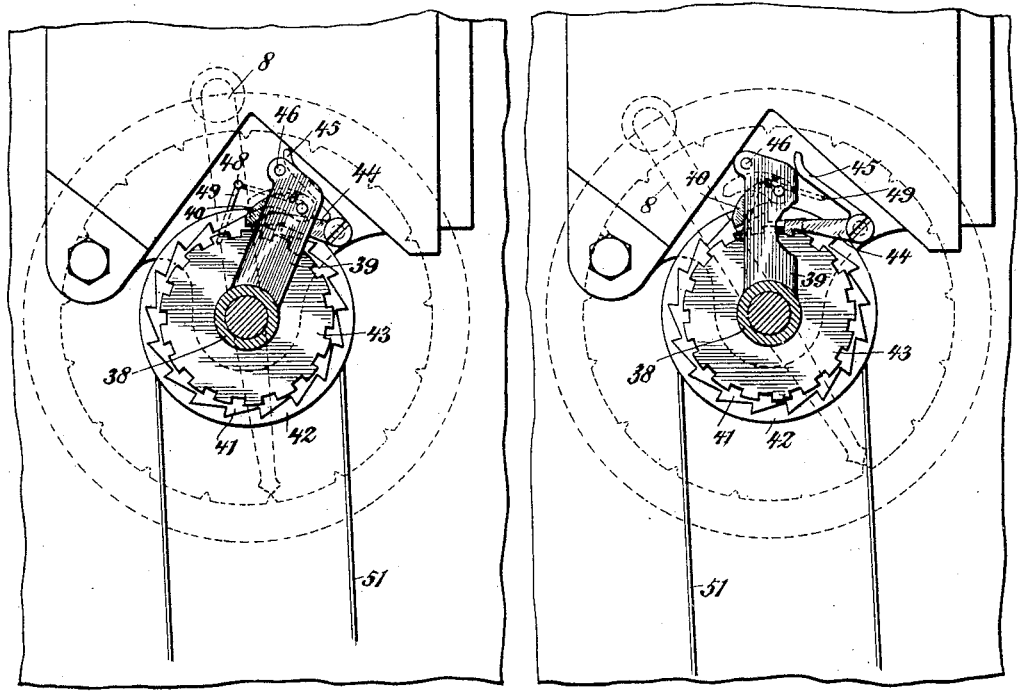
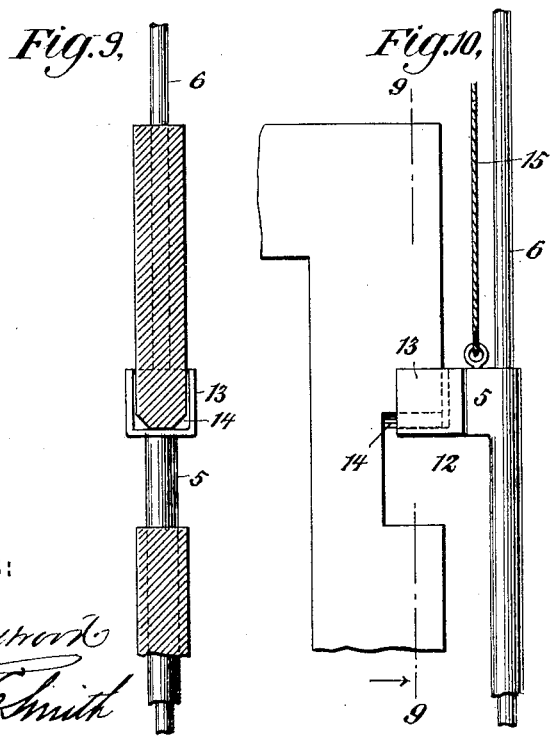
WITNESSES:
INVENTOR
Gustav A. Brachhausen
BY Briesen & Knauth
ATTORNEYS.

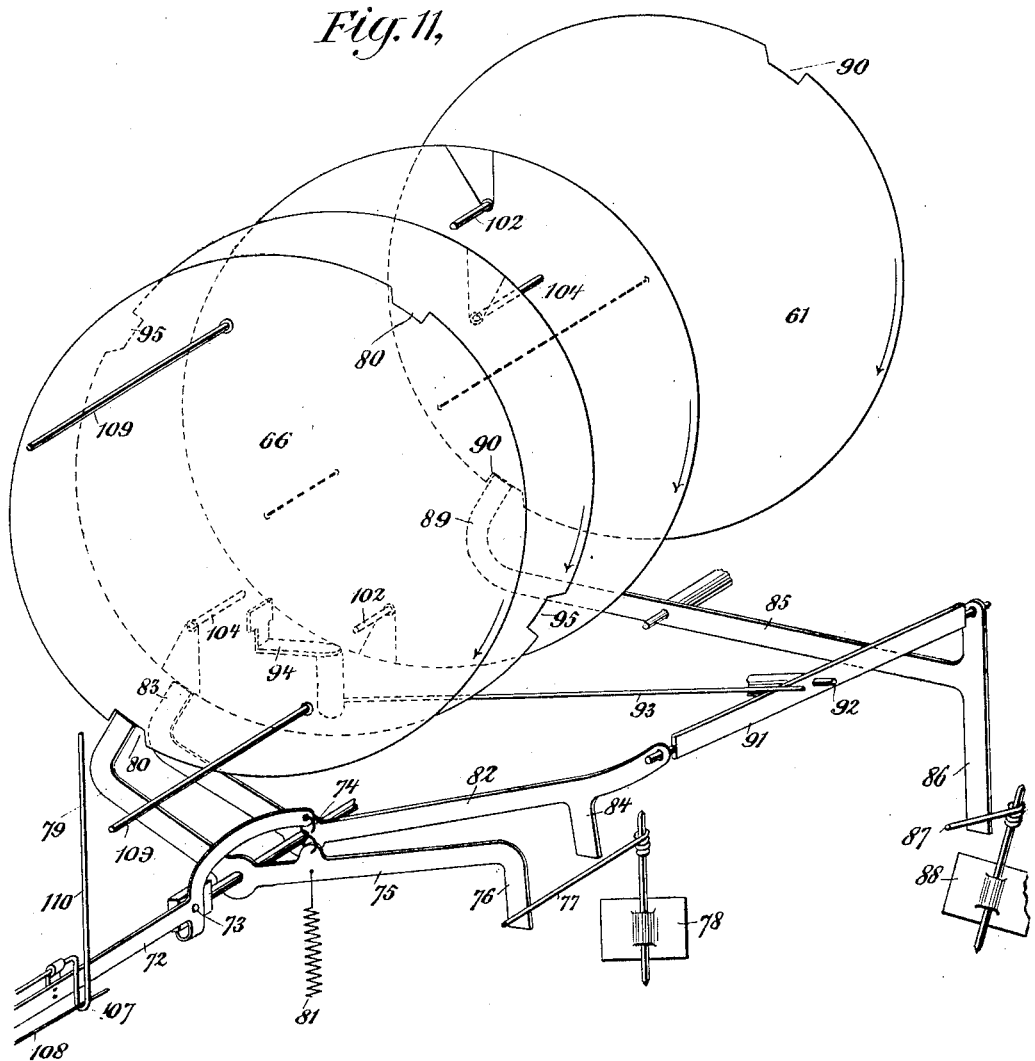

(No Model.)  G. A. BRACHHAUSEN.  8 Sheets—Sheet 8.
AUTOMATIC MUSICAL INSTRUMENT.
No. 596,393.  Patented Dec. 28, 1897.
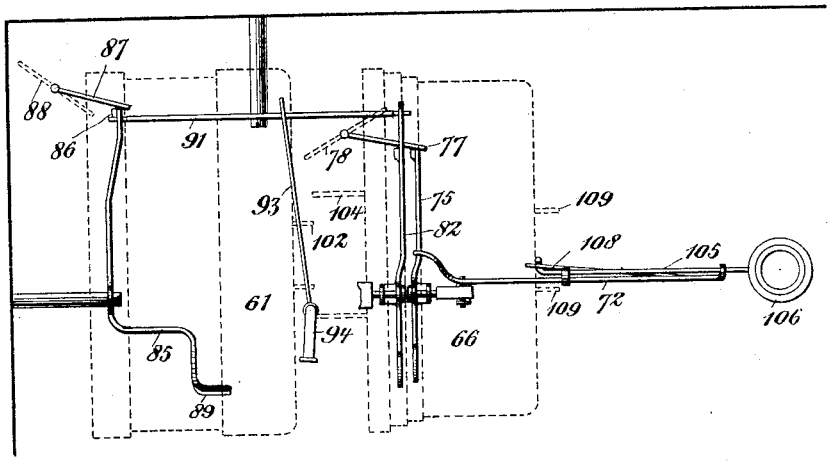
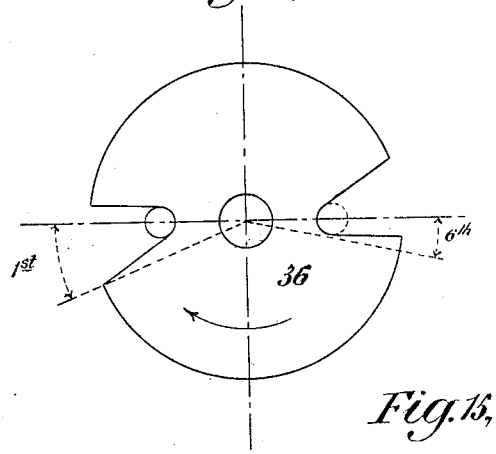
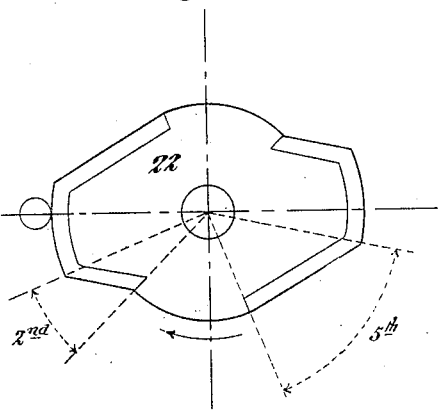
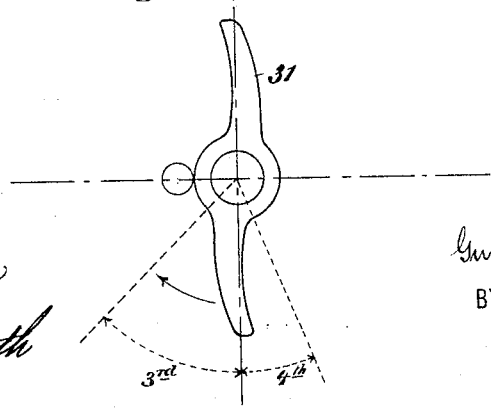
WITNESSES:
INVENTOR
Gustav A. Brachhausen
BY Briesen & Knauth
ATTORNEYS.

UNITED STATES PATENT OFFICE.

GUSTAV A. BRACHHAUSEN, OF RAHWAY, NEW JERSEY.

AUTOMATIC MUSICAL INSTRUMENT.

SPECIFICATION forming part of Letters Patent No. 596,393, dated December 28, 1897.

Application filed April 1, 1897. Serial No. 630,238. (No model.)

*To all whom it may concern:*

Be it known that I, GUSTAV A. BRACHHAUSEN, a resident of Rahway, Union county, State of New Jersey, have invented certain new and useful Improvements in Automatic Musical Instruments, of which the following is a full, clear, and exact description.

In mechanical musical instruments heretofore made wherein separate note sheets or disks have been employed more or less difficulty has been found in replacing the note disks or sheets when it was desired to play a new tune. This difficulty has been found most annoying when the instruments were arranged to be automatically operated by a coin or otherwise, as is commonly found in public places. So great has this difficulty been that to avoid the liability of injury by those changing the disks who were unfamiliar with the construction of the instrument it has been found desirable to provide but one note-disk for use in an instrument for a considerable length of time, and thereby greatly depreciate the value of the interchangeable note-sheet feature of the instrument.

The object of my invention is to overcome this disadvantage heretofore found in mechanical musical instruments and to provide a mechanical musical instrument wherein separate note disks or sheets can be automatically fed either successively in accordance with a predetermined arrangement or any desired disk may be conveyed out of its order to operative position to operate a musical instrument, and to provide a device wherein all of the operations are brought about automatically.

To these ends my invention consists in the novel arrangement and combination of parts and to certain details hereinafter described and claimed.

In the accompanying drawings, wherein like reference-characters indicate corresponding parts in the various views, Figure 1 is a face view, with a portion of the casing removed, of a device embodying my invention. Fig. 2 is a central vertical section of the same. Fig. 3 is an external side view of the device with parts broken away. Fig. 4 is a rear view of the upper half of my device with a portion of the casing removed. Fig. 5 is an enlarged detail view of certain portions of my device, to be hereinafter more fully explained. Fig. 6 is a vertical section on the line 6 6 of Fig. 5, looking in the direction of the arrow. Figs. 7 and 8 are enlarged detail end views of the note-disk-carriage-shifting mechanism, the parts being shown in different positions in the two views. Figs. 9 and 10 are enlarged fragmentary details of a disk-carrying frame and side carriers therefor. Figs. 11 and 12 are diagrammatic views of the stopping and starting mechanism illustrated in Fig. 5. Figs. 13, 14, and 15 are diagrammatic views of the operating-cams.

I will first proceed to describe the general operation of my device and then refer to the mechanism for bringing about the results described.

Each of the note-disks 1 is carried in a separate frame 2. These frames are supported on a carriage 3, adapted to move along the tracks 4. Side pieces or carriers 5 are adapted to travel up and down upon guide-rods 6 and convey a note-disk, together with the frame which carries it, to operative position at the upper half of the instrument, as indicated in Figs. 1 and 4, after which the note-disk is clamped in the operative position and is automatically driven around its axis to operate upon the sound-producing device 7. After a complete revolution of the disk, or after a tune has been once played, the clamping device which secures the disk in operative position is automatically thrown out of engagement and the disk, together with the frame which carries it, is automatically lowered by the side carriers 5. The carriage which supports the note-disks and their frames is then automatically traversed and the side pieces engage with the next adjacent frame or any frame which may be determined upon by setting the hand or pointer 8 upon the dial 9. The side pieces then automatically engage and carry the next frame to operative position. When the clamping mechanism again operates automatically to secure the note-sheet in operative position, the note-disk is rotated to operate the sound-producing devices, and so on the operation is repeated and the parts automatically operated until each of the disks on the carriage 3 has been played.

The general description of the operation of my device having been explained, I will now proceed to describe the mechanism whereby the above operations are brought about.

The carriage 3 is provided with a series of recessed cleats 10, adapted to receive between them the frames 2, which support the disks 1. Each of these disks is supported in a frame 2 upon grooved pulleys 11, so as to allow of a rotation of the disk independent of its frame. Each of the frames is provided with suitable mechanism for engaging the side carriers 5. This means is shown in the present instance to comprise notched portions 12 on each side of the frame, in which the recessed lugs 13 (see Figs. 9 and 10) are adapted to pass. The upper wall of each of these notched portions is preferably beveled, as indicated at 14, so that when the lugs 13 of the traversing pieces 5 register within the notched portions 12 and the side carriers 5 are raised the frames will readily seat themselves within the recessed lugs and be held in place therein. Each of the traversing pieces or carriers 5 is connected, as by a cord 15, with a pulley 16, fixed upon a shaft 17, to which is likewise attached a pulley 18, which is rotated by an arm 19 through an intermediate cord 20. This arm 19 constitutes one arm of the bell-crank lever, the other arm of which is indicated at 21 and is provided with a bowl which is normally maintained in contact with the cam 22 by a spring 23. This cam-piece 22 constitutes part of the automatic shifting mechanism to be hereinafter more fully described, and a rotation thereof brings about the movement of the frames 2, with the note-sheets 1 carried thereby, to and from operative position in the instrument. As a note-disk 1 is carried to operative position, as indicated at the upper portion of Fig. 1 and in Fig. 4, the rod 24, which carries antifriction-rollers 25, is maintained out of the path of the note-disk and frame, as indicated in Fig. 6. This movement of the rod 24 is brought about by springs 26 through the connecting-rods 27, upon which they are carried, and the arms 28. A rock-shaft 29 carries an arm 30, which is operated upon by the cam 31. At the outer ends of this rock-shaft are carried tappet-pieces 32, each of which is adapted to contact with an arm 28 to shift the rod 24 into engagement with the note-disk. At or about the center of this same rock-shaft 29 is carried an arm 33, which connects with a plunger 34. (See Fig. 2.) This plunger 34 is adapted to pass through an aperture in the plate 35, which constitutes a bed-plate for the instrument or sound-producing device 7 and is adapted to pass into a recess 36 in the rod 24. The location of the arm 33 and tappet-pieces 32 upon the rock-shaft 29 is such that the movement of the rock-shaft through the arm 30 and cam 31 will cause the plunger 34 and rod 24 to be moved in opposite directions, so that when a note-disk is carried to operative position, as indicated in Fig. 2 of the drawings, a rotation of the cam 31 will cause the plunger 34 to be forced through a central aperture in the disk 1 and cause the rod 24, with the antifriction-rollers carried thereon, to bear against the outside of the disk and thus clamp it in the operative position.

Motion is transmitted from the starting and stopping mechanism to automatically operate the carriage 3 by means of a cam 36. The free end of an arm 37 bears against the cam 36, as is clearly indicated in Fig. 6, and the opposite end of this arm 37 is connected with a sleeve 38, which carries an arm 39, that is provided with a pawl 40, that engages a ratchet-wheel 41, connected with a sprocket-wheel 42. Connected with the ratchet-wheel 41 is a locking-wheel 43, which is adapted to be engaged and prevented from movement in either direction by a pawl 44. This pawl is provided with an arm 45, which normally projects into the path of a pin 46, carried upon the arm 39, so that a movement of said arm in one direction will cause the pawl 44 to be moved out of engagement with the locking-wheel and a movement of the arm in the opposite direction will release said pawl 44 and allow the same to engage the locking-wheel 43 and prevent rotation of the parts in either direction. The pointer 8, hereinbefore referred to, is carried upon the outside of the casing and connects with the sprocket-wheel 42 and the parts united thereto, so that as the sprocket-wheel is rotated the pointer revolves with it to indicate upon the dial 9 the tune to be played—that is to say, the disk which is to be brought next into operative position in the instrument. A small pointer 47 is likewise provided upon the dial and is connected with a rock-shaft 48, which projects through the casing and is provided with an arm 49, that is adapted to be turned into the path of a pin carried upon the pawl 40 and hold the same out of engagement with the ratchet, as shown in dotted lines in Fig. 7. This device is provided for the purpose of allowing the tune being played to be repeated. It will be observed that the turning of the pointer 47 in the direction the letter "R" on the dial will cause the arm 49 to raise the pawl out of engagement with the ratchet-wheel, and when the next movement of the arm 39 is had to turn the sprocket-wheel 42 and thereby shift the carriage 3 to bring the next note-disk into position to be carried to operative position in the instrument the ratchet-wheel 41 will not be affected. When, however, the sprocket-wheel 42 has been rotated, it transmits motion through a band 51 to a corresponding sprocket-wheel 50, Fig. 3, mounted upon a portion of the casing. This sprocket-wheel 50 is connected with means for transmitting motion to the note-disk carriage 3. In the present instance this means is shown to comprise links 52 53, which are connected to the sprocket 50 and the carriage 3, respectively; but it is obvious that various other mechanism may be employed for the purpose.

The number of teeth on the ratchet-wheel 41 and the number of spaces on the dial should correspond, so that a movement of the mechanism the distance of one tooth will cause a movement of the pointer on the dial the distance between two figures. By this means it will be seen that the pointer will always point to a number on the dial corresponding to the tooth on the ratchet-wheel which corresponds to a certain predetermined disk on the carriage.

Referring specifically to Fig. 5, it will be observed that a spindle 54 constitutes a support or bearing for the main winding-gear 55, that is engaged by a pinion 56, which has an arbor (not shown) that constitutes a winding-post adapted to be engaged by a winding-crank 57. This gear 55 forms part of a sleeve which rotates freely upon the supporting-spindle 54 and is provided with one member 58 of a two-part clutch. The second member of the two-part clutch is formed on one end of a sleeve 59, which is loosely carried upon the spindle 54, the sleeve being connected with the inner end of the spring 60, contained within the main spring-drum 61. The gear 62 of this drum drives a train of gear which is provided with a suitable escapement for a purpose to be hereinafter fully explained. The end of the sleeve 59, which projects outside of the drum 61, constitutes one member 63 of a second two-part-clutch mechanism which is adapted to connect with a sleeve 64, similar to the sleeve 59, and to which is connected the inner end of the spring 65, contained within a second drum 66, the gear 67 of which is connected with a train of gear and with an escapement, as will be hereinafter described. Upon the sleeve 64 is carried the cam 36, which is connected to rotate with the drum 66 by a pin 69. Loosely carried upon the spindle 54 to the right of the drum 66 (in Fig. 5,) is the cam 31, and the cam-piece 22 is to the right of the cam 31, a pin 71 being utilized to connect the drum 66 and cams 31 and 22 to rotate together. Thus it will be seen that the gear 55 and the sleeves 59 and 64 are connected to rotate together to wind the springs 60 and 65 at one operation, whereas the drum 61 rotates independently around the sleeve 59, and the drum 66 and the cams 36, 31, and 22 rotate together. Furthermore, it will be seen that all of these parts are strung upon and rotate around the spindle 54.

Having described that portion of my improved mechanism which causes a movement of the various portions of my device, I will now describe the controlling mechanism, whereby movement of various parts is brought about.

I would first call attention to the fact that Figs. 1, 2, 3, 4, and 8 show the position of the parts when the device is running, whereas Figs. 5, 6, 7, and 11 represent the device in the normal position or the position of rest. It is thought that the construction and operation of this portion of my device will be best understood by referring to the diagrammatic view shown in Fig. 11, wherein 72 indicates a starting-lever pivoted at 73 and which may be operated in any desirable manner. This lever 72 is connected, as at 74, to a pivoted lever 75, the nose 76 of which is adapted to project into the path of the arm 77 of the governor 78 when the parts are in a position of rest. A nose 79 on the opposite end of the pivoted lever 75 is adapted to project into one of the notches 80 in the auxiliary spring-drum 66 when the parts are in the position of rest and to be maintained therein by a suitable spring 81. A second pivoted lever 82, similar to the lever 75, has the nose 83 thereof maintained on the periphery of the drum 66 when the parts are in the normal position, while the nose 84 of said lever 82 is maintained out of the path of the arm 77 of the governor 78. A third pivoted lever 85, somewhat similar to the levers 75 and 82, is provided with a nose 86, which is projected into the path of the arm 87 of the governor 88 of the main gear, and the nose 89 of said lever 85 projects into a notch 90 in the main spring-drum 61 when the parts are in their normal position. A lever 91, pivoted at 92, is connected to the levers 82 and 85 and is itself pressed down by a spring 93, which is carried by a pivoted block 94, that is adapted to be shifted to move the spring 93 first to one side and then to the other side of the pivot 92, as will be hereinafter more fully explained.

The construction of the mechanism whereby the various parts are set in motion having been described, I will now proceed to describe the operation thereof.

The parts being in the position represented in Figs. 5, 6, 7, and 11 the free end of starting-lever 72 is depressed by hand or otherwise, which results in rocking the lever 75 against the tension of its spring and thereby causes the nose 76 to release the governor 78 and the nose 79 to be withdrawn from the notch 80 in the auxiliary spring-drum 66. The governor 78 having been released in the manner described the drum 66 will make a quarter-turn, which will cause the cams 36, 31, and 22, connected therewith, to rotate a like distance. During the quarter-turn of the auxiliary spring-drum and the cams connected therewith the parts are operated in the following manner: The first movement of the auxiliary drum causes the cam 36 (see Fig. 13) during, say, one-sixteenth of a revolution of said drum to shift the lever 37, which operates the carriage 3 to bring a note-disk 1 into the path of the side carriers 5 and lock the carriage in the shifted position in the manner which has been hereinbefore explained. The cam 22 during this movement has a wait on the highest portion of the cam. When, however, the carriage has been shifted, an inclined face of the cam 22 is reached and the arm 21 of the bell-crank lever 19 21 is allowed to ride down the same to bring a music-disk frame 2 and the disk 1 carried thereby up into operative position in the instrument in the manner which has been heretofore explained. This movement of the note-disk is brought about during, say, one-sixteenth of a revolution of the auxiliary drum, as is represented by the second movement in the diagram in Fig. 14. During this movement of the parts from the position of rest the arm 30, which shifts the note-disk-locking mechanism, bears upon the lowest portion of the cam 31, so that the locking mechanism is maintained open to admit the note-disk. The lowest portion of the cam 31 has a wait during one-eighth of a revolution, so that the lever 30 is not affected until the carriage has been shifted and the note-disk is in operative position, when a rise of the cam quickly shifts the lever 30 to cause the note-disk to be locked or clamped in operative position in the manner heretofore pointed out. This third movement (see Fig. 15) is brought about during one-eighth of a revolution of the auxiliary spring-drum, during which time the cams 36 and 22 have a wait. The auxiliary drum has now completed the quarter-revolution brought about by shifting the starting-lever. Referring again to Fig. 11, it will be observed that this quarter-revolution of the drum 66 brings one of the notches 95 therein into the path of the nose 83 of the lever 82, and the spring 93 causes said nose 83 to be forced into the notch and the nose 84 to be projected into the path of the governor 78 and thereby prevent further rotation of the auxiliary drum 66 and the parts connected therewith. This movement of the lever 82 causes the lever 91 to be rocked around its pivot to withdraw the nose 86 on the lever 85 from the path of the governor 88 and at the same time withdraw the nose 89 from the notch 90 in the main drum 61. The main drum is now free to rotate, and the gear 62 thereon (see Fig. 6) operates to rotate the disk 1 around its pivot through the train of gear 97 98 and the spur-wheel 99, which is shown to engage in perforations 100 in the disk. A complete rotation of the note-disk causes a tune to be played upon the musical instrument proper or sounding device 7 through the intermediate star-wheels 101 or otherwise. A half-revolution of the main drum 61 causes a complete revolution of the note-disk. During the first portion of this movement of the main drum one of the two pins 102 carried thereby strikes against the pivoted block 94 and shifts the spring 93, carried by said block, to the opposite side of the pivot 92 of the lever 91. When the main drum has completed its half-revolution, one of the two notches 90 is brought into the path of the nose 89 of the lever 85 and allows the nose 86 to be projected into the path of the governor 88 to arrest further movement of the parts, it being understood that the spring 93 brings about this movement of the levers when one of the notches 90 in the main drum is reached. It will be remembered that the auxiliary spring-drum and the cams connected therewith were left in a state of rest after the third movement of the parts was brought about and the main drum was started to rotate the note-disk. This was when the auxiliary spring-drum had made a quarter of a revolution, which left the arm 30 of the note-disk-clamping device on a highest portion of the cam 31 and maintained the clamping device locked. When the main drum has completed the half-revolution and the lever 91 has been operated in the manner described to stop the governor 88, the lever 82 will be raised through its connection with the lever 91 to release the governor 78, it being remembered that lever 75 was operated by the initial movement of starting-lever 72 to carry it out of the path of said governor and that it has since been maintained in this position because of the full portion of the drum 66 between the notches 80, upon which the nose 79 of the lever 75 still rests. The governor 78 being released, the auxiliary drum is again set in operation, and during one-sixteenth of a revolution, which is illustrated as the fourth movement in the diagram in Fig. 15, the arm 30 of the note-disk-clamping mechanism is allowed to pass from the highest portion of the cam to the lowest portion thereof and thereby release the clamping mechanism, so that the note-disk and its frame are free to be returned to the carriage. The end 21 of the bell-crank lever 19 21 is by this time brought into contact with an inclined face of the cam 22, when the fifth movement, which occupies one-eighth of a revoultion, (see Fig. 14,) occurs by the bell-crank lever being forced against the tension of its spring 23 by the cam 22 to lower the note-disk and frame into its respective place on the carriage. The cam 31 during this fifth step has a wait, so that the arm 30 controlled thereby is not affected. During the next five thirty-seconds of a revolution the cams 22, 31, and 36 have a wait, and in the next one thirty-second of a revolution an opening in the cam 36 is brought into the path of the arm 37 of the carriage-shifting device, which is forced in said opening by a spring 103. It will be remembered that the carriage 3 is only operated by a movement of the arm 37 in one direction, so that a movement of the arm 37 back to the position from which it was originally shifted will not effect a movement of the carriage. The auxiliary drum in completing the second quarter of a revolution causes one of two pins 104 thereon to be brought into contact with the pivoted block 94 and to shift the spring 93 to the opposite side of the pivot—that is to say, back to the side from which it was originally moved and which is represented in Fig. 11. When the auxiliary drum has completed the second quarter of a revolution, the nose 79 of the lever 75 is again forced into a notch 80 and the nose 76 projected into the path of the governor 78 and the entire mechanism is brought to a standstill, the parts being in the same relative position that they were in when the device was first set in operation.

In Fig. 12 the controlling-levers and parts coöperating therewith are arranged as they appear in the various other figures of the drawings, whereas in Fig. 11 they have been distorted for purposes of clearer illustration. While it is obvious that the starting-lever 72 may be operated in any desirable manner, for public places I prefer to provide a coin-operating device for starting the instrument. This device is best illustrated in Figs. 4, 5, and 11, wherein the starting-lever 72 is shown to support a rod 105, which is adapted to turn in its bearings. At one end of this rod is carried a bottomless coin-pan 106, the opening in which is slightly smaller than the diameter of the coin intended to be used to operate the apparatus. The opposite end of this rod 105 is bent, as indicated at 107, for the reception of one end of a spring 108, carried by the starting-lever. The free end 110 of the rod extends into the path of the pins 109 on the auxiliary cylinder 66. A coin of the proper denomination having been conveyed to the coin-pan by a suitable chute or otherwise will by its weight press down the outer end of the starting-lever and start the mechanism in operation. After the mechanism has been set in operation one of the pins 109 will contact with the arm 110 and turn the rod 105 on its axis against the tension of the spring 108 and discharge the coin contained in the pan. A further rotation of the auxiliary drum will carry the pin out of the path of the arm 110 and the pan will be restored to its normal position by the spring 108.

It is thought that from the foregoing description the operation of my device will be readily understood. However, brief reference thereto will be made.

Assuming the parts to be in the position of rest and that none of the tunes have been played, then the starting-lever 72 is moved by a coin or by hand and the auxiliary drum 66 is set in operation. This results in the cam 36 operating the carriage-shifting mechanism to shift the carriage to bring the first note-disk thereon into the path of the side carriers 5. The cam 22 then causes the carriers 5 to raise the first note-disk frame, with its note-disk, into operative position in the device, when the cam 31 causes the plunger 34, which acts as a pivot for the note-disk, to be inserted in the central hole in the disk and the arm 24, with the friction-rollers, to bear against the outer face of the disk and thus clamp the note-disk in operative position, with the spur-wheel 99 engaging the apertures in the disk. The auxiliary drum 66 and the parts connected therewith are then automatically thrown out of operation and maintained in a state of rest by the stopping and starting mechanism, and the main drum 61 is set in operation to rotate the note-disk in its frame around its pivot 70 to operate the musical instrument proper. After the note-disk has completed one revolution the main drum is automatically thrown out of operation, and the auxiliary drum is again automatically set in operation. The cam 31 then causes the note-disk-clamping mechanism to be unlocked, and the note-disk which has just played its tune is lowered into its respective place on the carriage by the cam 22 and the device has completed its operation. It will be remembered that the pointer 8 is connected with the sprocket-wheel 42, so as to rotate therewith. By this means the pointer always indicates on the dial 9 a number which has a corresponding number upon the list 111 (see Fig. 3) to indicate the name of the tune being played. Should it be desired to repeat the tune, it is merely necessary to turn the small pointer 47 to the letter "R," which, as has been described, throws the pawl 40 out of operation, so that when the arm 37 is again moved outward by the cam 36 the carriage 3 will not be moved, and the same note-disk will be carried back to operative position in the instrument when the starting-lever is again moved. Should the operator desire to play a tune other than the next succeeding tune on the dial, it is merely necessary to turn the pointer in the direction of the arrow in Fig. 3 until it arrives at the number on the dial which corresponds to the tune to be played. The effect of this is to turn the sprocket-wheel 42, and thereby transmit motion to the carriage to bring the note-disk corresponding to the number on the dial into position to be elevated by the carriers 5 to operative position in the instrument. It will be seen, however, that this can only be accomplished after the main spring-drum or driving mechanism has completed its movement, because it is not until this time that the carriage-locking mechanism is unlocked. Thus there is absolutely no danger of the instrument being broken from an operator handling it who is not familiar with its construction.

While I have described with considerable detail an apparatus embodying my invention, I would have it distinctly understood that it merely represents one form in which my invention may be clothed and that I do not limit myself to the construction and arrangement of parts shown and described, since many modifications in the construction and operation of the device may be made without departing from the spirit of my invention.

It will be observed that by my invention the entire device operates automatically, it merely being necessary to shift the starting-lever by the insertion of a coin or otherwise each time it is desired to play a tune.

Having described my invention, what I claim, and desire to secure by Letters Patent, is—

1. The combination of a musical instrument, separate tune-sheets for operating the same, means for conveying said sheets to operative position in the musical instrument and means for automatically feeding the said sheets to a position to be fed to the operative position.

2. The combination of a musical instrument, separate tune-sheets for operating the same, means for automatically conveying said sheets to and from operative position in the musical instrument and means for automatically feeding said sheets to a position to be fed to the operative position.

3. The combination of a musical instrument, separate tune-sheets for operating the same, means for conveying said sheets to operative position in a musical instrument, means for automatically feeding the sheets to a position to be fed to the operative position and means for holding the note-sheet when in operative position and for automatically releasing said sheet after the tune has been played thereby.

4. The combination of a musical instrument, separate tune-sheets for operating the same, means for automatically conveying said sheets to and from operative position in a musical instrument, means for automatically feeding said sheets to a position to be fed to the operative position and means for automatically engaging and holding a note-sheet while in the operative position and for automatically releasing said sheet after the tune has been played thereby.

5. The combination of a mechanical musical instrument, separate tune-sheets for operating the same, means for automatically conveying said sheets to and from operative position in the musical instrument, means for automatically feeding said sheets to a position to be fed to the operative position and hand-operated means for selecting any of the sheets for conveyance to operative position in the musical instrument.

6. The combination of a note-disk frame, a note-disk supported by and adapted to revolve therein and means for conveying said note-disk and frame to and from operative position in the instrument.

7. The combination of a note-disk frame, a note-disk supported by and adapted to revolve therein and means for automatically conveying said note-disk and frame to and from operative position in the instrument.

8. The combination of a note-disk frame, a note-disk supported by and adapted to revolve therein and means for automatically feeding said disk and frame to a position where it can be conveyed to operative position in the instrument and means for automatically conveying said note-disk and frame to and from operative position in the instrument.

9. The combination of a note-disk frame, a note-disk supported by and adapted to revolve therein, side carriers for conveying said note-disk and frame to and from operative position in the instrument and means for automatically feeding said disk and frame to a position where it can be engaged by said carriers and conveyed to operative position in the instrument.

10. The combination of a note-disk carriage, a plurality of note-disks upon said carriage, each of said note-disks being carried by a separate frame in which it is adapted to revolve, a pointer and index coöperating therewith, intermediate mechanism between said pointer and the note-disk carriage, whereby a movement of the pointer from one indication on the index to another will cause a movement of the note-disk carriage to bring a note-disk and its frame to a point where it can be removed from the carriage.

11. The combination of a note-disk carriage, means for automatically moving said carriage, a plurality of note-disks upon said carriage, each of said note-disks being carried by a separate frame in which it is adapted to revolve, a pointer and index coöperating therewith, intermediate mechanism between said pointer and the note-disk carriage, whereby a movement of the pointer from one indication on the index to another will cause a movement of the note-disk carriage to bring a note-disk and its frame to a point where it can be removed from the carriage.

12. The combination of a note-disk carriage, means for automatically moving said carriage, a plurality of note-disks upon said carriage, each of said note-disks being carried by a separate frame in which it is adapted to revolve, a pointer connected with the means for automatically moving the carriage and an index coöperating with said pointer whereby the carriage can be shifted either automatically or by hand.

13. The combination with a note-sheet carriage, of hand-operated mechanism for moving said carriage, means for feeding the note-sheet to operative position and means for rendering said carriage-moving mechanism inoperative.

14. The combination with a note-sheet carriage, of mechanism for automatically moving said carriage and means for automatically locking the carriage against movement after each movement thereof.

15. The combination with a note-sheet carriage, of mechanism for moving said carriage, means for locking the carriage against movement after each movement thereof and means for throwing the carriage-moving mechanism out of operation.

16. The combination with a note-sheet carriage, of means for automatically moving said carriage in one direction and automatic means for maintaining the carriage unlocked when it is being moved and for automatically locking said carriage against movement after it has been moved.

17. The combination with a musical instrument and means for operating the same, of a note-sheet carriage, means for moving said carriage and automatic means for maintaining the carriage unlocked when it is being moved and for automatically locking and maintaining said carriage locked against movement while the musical instrument is being operated.

18. The combination with a note-sheet carriage, of means for automatically moving said carriage, automatic means for maintaining the carriage unlocked when it is being moved and for automatically locking said carriage against movement after it has been moved and mechanism for throwing the automatic locking means out of operation.

19. The combination with a note-sheet carriage, of means for automatically moving said carriage and hand-operated mechanism for moving said carriage independently of the automatic movement thereof.

20. The combination with a note-sheet carriage, of means for automatically moving said carriage, hand-operated mechanism for moving said carriage independently of the automatic movement thereof and means for locking said carriage against movement after each automatic operation thereof.

21. The combination with a note-sheet carriage, of means for automatically moving said carriage, hand-operated mechanism for moving said carriage independently of the automatic movement thereof, means for locking said carriage against movement after each automatic operation thereof and mechanism for throwing the carriage-locking means out of operation.

22. The combination with a note-sheet carriage, of means for automatically moving said carriage, a pointer connected with said carriage-moving means, a dial coöperating with said pointer and means for locking the carriage against movement after the carriage has been moved and for unlocking said carriage before the instrument is again operated.

23. The combination with a note-sheet carriage, of means for automatically moving said carriage, a pointer connected with said carriage-moving means, a dial coöperating with said pointer, automatic means for automatically locking the carriage against movement after the carriage has been moved and for automatically unlocking said carriage before the instrument is again operated.

24. The combination with a note-sheet carriage, of means for moving said carriage, a pointer connected with said carriage-moving means, a dial coöperating with said pointer, mechanism for throwing the automatic carriage-moving mechanism out of operation and automatic means for automatically locking the carriage against movement after the carriage has been moved and for automatically unlocking said carriage before the instrument is again operated.

25. The combination with a note-sheet carriage, of a vibratory arm having a pawl thereon, means for vibrating said arm, a ratchet coöperating with the pawl and intermediate mechanism between said ratchet and the note-sheet carriage.

26. The combination with a note-sheet carriage, of a vibratory arm having a pawl thereon, means for vibrating said arm, a ratchet coöperating with the pawl, intermediate mechanism between said ratchet and the note-sheet carriage and shifting means for throwing the pawl out of engagement with the ratchet.

27. The combination with a note-sheet carriage of a vibratory arm having a pawl thereon, means for vibrating said arm, a ratchet coöperating with the pawl, intermediate mechanism between said ratchet and the note-sheet carriage and means for locking said ratchet against movement when the vibratory arm is moved in one direction and for unlocking it when the arm is moved in an opposite direction.

28. The combination with a note-sheet carriage, of a vibratory arm having a pawl thereon, means for vibrating said arm, a ratchet coöperating with the pawl, intermediate mechanism between said ratchet and the note-sheet carriage, a locking-wheel connected with said ratchet-wheel, a locking-pawl adapted to engage the locking-wheel and prevent movement thereof and a pin or abutment carried by the vibratory arm, which pin is adapted to lift said locking-pawl out of engagement with the locking-wheel.

29. The combination with a note-sheet carriage, of a vibratory arm having a pawl thereon, means for vibrating said arm, a ratchet coöperating with the pawl, intermediate mechanism between said ratchet and the note-sheet carriage, means for throwing the pawl out of engagement with the ratchet, a locking-wheel connected with said ratchet-wheel, a locking-pawl adapted to engage the locking-wheel and prevent movement thereof and a pin or abutment carried by the vibratory arm, which pin is adapted to lift the locking-pawl out of engagement with the locking-wheel.

30. The combination with a note-sheet carriage, of a vibratory arm having a pawl thereon, means for vibrating said arm, a ratchet coöperating with the pawl, intermediate mechanism between said ratchet and the note-sheet carriage, a pointer connected and adapted to rotate with the said ratchet and a dial coöperating with the pointer.

31. The combination with a note-sheet carriage, of a vibratory arm having a pawl thereon, means for vibrating the said arm, a ratchet coöperating with the pawl, intermediate mechanism between the ratchet and the note-sheet carriage, shifting means for throwing the pawl out of engagement with the ratchet, a pointer connected and adapted to rotate with said ratchet and a dial coöperating with the pointer.

32. The combination with a note-sheet carriage, of a vibratory arm having a pawl thereon, means for vibrating said arm, a ratchet coöperating with the pawl, intermediate mechanism between said ratchet and note-sheet carriage, a locking-wheel connected with said ratchet-wheel, a locking-pawl adapted to engage the locking-wheel and prevent movement thereof and a pin or abutment carried by the vibratory arm, which pin is adapted to lift said locking-pawl out of engagement with the locking-wheel, a pointer connected and adapted to rotate with said ratchet-wheel and a dial coöperating with the pointer.

33. In a musical instrument the combination of a main driving-motor, an auxiliary driving-motor, and intermediate controlling mechanism between the said main and auxiliary driving-motors, which intermediate mechanism is operated by the movement of the motors themselves to throw either of said motors into operation when the other is thrown out of operation.

34. The combination of a main driving mechanism, means driven thereby for operating a note-sheet, an auxiliary driving mechanism, means driven thereby for feeding a note-sheet to and from operative position and intermediate controlling mechanism between the said main and auxiliary driving mechanisms to stop one when the other is started.

35. The combination of a main driving mechanism, means driven thereby for operating a note-sheet, an auxiliary driving mechanism, means driven thereby for selecting a note-sheet and for feeding the selected note-sheet to and from operative position and intermediate controlling mechanism between the said main and auxiliary driving mechanisms to throw one into operation when the other is thrown out of operation.

36. The combination of a main driving mechanism, means driven thereby for operating a note-sheet, an auxiliary driving mechanism, a note-sheet carriage, means driven by the auxiliary driving mechanism for moving the note-sheet carriage, intermediate controlling mechanism between the said main and auxiliary driving mechanisms to throw one into operation when the other is thrown out of operation.

37. The combination of a main driving mechanism, means driven thereby for operating a note-sheet, an auxiliary driving mechanism, a note-sheet carriage, means driven by the auxiliary driving mechanism for moving the note-sheet carriage, means operated by the auxiliary mechanism for conveying a note-sheet to and from operative position in the instrument and intermediate mechanism between said main and auxiliary driving mechanisms to throw one of said mechanisms into operation when the other is thrown out of operation.

38. The combination of a main driving mechanism, means driven thereby for operating a note-sheet, an auxiliary driving mechanism, a note-sheet carriage, means driven by the auxiliary driving mechanism for moving the note-sheet carriage, means operated by the auxiliary mechanism for conveying a note-sheet to and from operative position in the instrument, means for clamping a note-sheet in operative position, and intermediate controlling mechanism between the said main and auxiliary driving mechanisms to throw one of said mechanisms into operation when the other is thrown out of operation.

39. The combination of a main driving mechanism, means driven thereby for operating a note-sheet, an auxiliary driving mechanism, a note-sheet carriage, means driven by the auxiliary driving mechanism for moving the note-sheet carriage, means operated by the auxiliary mechanism for conveying a note-sheet to and from operative position in the instrument, means operated by the auxiliary driving mechanism for automatically clamping a note-sheet in operative position and intermediate controlling mechanism between said main and auxiliary driving mechanisms to throw one of said mechanisms into operation when the other is thrown out of operation.

40. The combination of a main driving mechanism, an auxiliary driving mechanism, means driven by said auxiliary driving mechanism for automatically feeding a note-sheet carriage, intermediate controlling mechanism between said main and auxiliary driving mechanisms for throwing one of said mechanisms into operation when the other is thrown out of operation, and a locking device with means for locking the carriage against movement when the main driving mechanism is in operation.

41. The combination of a main driving mechanism, an auxiliary driving mechanism, means driven by said auxiliary driving mechanism for automatically feeding a note-sheet carriage, intermediate controlling mechanism between said main and auxiliary driving mechanisms for throwing one of said mechanisms into operation when the other is thrown out of operation, a locking device with means for locking the carriage against movement when the main driving mechanism is in operation and means for unlocking said locking device after the main driving mechanism has completed its movement.

42. The combination of a main driving mechanism, an auxiliary driving mechanism, means driven by said auxiliary driving mechanism for automatically feeding a note-sheet carriage, intermediate controlling mechanism between said main and auxiliary driving mechanisms for throwing one of said mechanisms into operation when the other is thrown out of operation, a locking device with means connected with the auxiliary driving mechanism for automatically locking the carriage against movement when the main driving mechanism is in operation and means for automatically unlocking said locking device after the main driving mechanism has completed its movement.

43. The combination of a main driving mechanism, an auxiliary driving mechanism, means driven by said auxiliary driving mechanism for automatically feeding a note-sheet carriage, hand-operated mechanism for operating the carriage, intermediate controlling mechanism between said main and auxiliary driving mechanisms for throwing one of said mechanisms into operation when the other is thrown out of operation, a locking device with means for locking the carriage against movement when the main driving mechanism is in operation.

44. The combination of a main driving mechanism, an auxiliary driving mechanism, means driven by said auxiliary driving mechanism for automatically feeding a note-sheet carriage, a pointer connected with said means for automatically feeding a note-sheet to operative position, a dial coöperating with said pointer, intermediate controlling mechanism between said main and auxiliary driving mechanisms for throwing one of said mechanisms into operation when the other is thrown out of operation, a locking device with means for automatically locking the carriage against movement when the main driving mechanism is in operation and for automatically unlocking said locking device after the main driving mechanism has completed its movement.

45. The combination of a main driving mechanism, an auxiliary driving mechanism, means driven by said auxiliary driving mechanism for automatically feeding a note-sheet carriage, intermediate controlling mechanism between the said main and auxiliary driving mechanisms for throwing one of said mechanisms into operation when the other is thrown out of operation and means for automatically moving the note-sheet to and from operative position.

46. The combination of a main driving mechanism, an auxiliary driving mechanism, means driven by said auxiliary driving mechanism for automatically feeding a note-sheet carriage, intermediate controlling mechanism between said main and auxiliary driving mechanisms for throwing one of said mechanisms into operation when the other is thrown out of operation, mechanism for throwing out of operation the means for automatically moving the note-sheet carriage, a locking device with means for locking the carriage against movement when the main driving mechanism is in operation and means for unlocking said locking device after the main driving mechanism has completed its movement.

47. The combination of a main driving mechanism, an auxiliary driving mechanism, means driven by said auxiliary driving mechanism for automatically feeding a note-sheet carriage, intermediate mechanism between said main and auxiliary driving mechanisms for throwing one of said mechanisms into operation when the other is thrown out of operation, mechanism for throwing out of operation the means for automatically moving the note-sheet carriage, a locking device with means connected with the auxiliary driving mechanism for automatically locking the carriage against movement when the main driving mechanism is in operation and means for automatically unlocking said locking device after the main driving mechanism has completed its movement.

48. The combination of a main driving mechanism, an auxiliary driving mechanism, means driven by said auxiliary driving mechanism for automatically feeding a note-sheet carriage, hand-operated mechanism for operating the carriage, intermediate controlling mechanism between said main and auxiliary driving mechanisms for throwing one of said mechanisms into operation when the other is thrown out of operation, mechanism for throwing out of operation the means for automatically moving the note-sheet carriage, a locking device with means connected with the auxiliary driving mechanism for automatically locking the carriage against movement when the main driving mechanism is in operation and means for automatically unlocking said locking device after the main driving mechanism has completed its movement.

49. The combination of a main driving mechanism, an auxiliary driving mechanism, means driven by said auxiliary driving mechanism for automatically feeding a note-sheet carriage, a pointer connected with said means for automatically feeding a note-sheet carriage to operative position, a dial coöperating with said pointer, intermediate controlling mechanism between said main and auxiliary driving mechanisms for throwing one of said mechanisms into operation when the other is thrown out of operation, mechanism for throwing out of operation the means for automatically moving the note-sheet carriage, and a locking device with means for locking the carriage against movement when the main driving mechanism is in operation.

50. The combination of a main driving mechanism, an auxiliary driving mechanism, means driven by said auxiliary driving mechanism for automatically feeding a note-sheet carriage, a pointer connected with said means for automatically feeding a note-sheet carriage to operative position, a dial coöperating with said pointer, intermediate controlling mechanism between said main and auxiliary driving mechanisms for throwing one of said mechanisms into operation when the other is thrown out of operation, mechanism for throwing out of operation the means for automatically moving the note-sheet carriage, a locking device with means connected with the auxiliary driving mechanism for automatically locking the carriage against movement when the main driving mechanism is in operation and means for automatically unlocking said locking device after the main driving mechanism has completed its movement.

51. The combination with a note-sheet carriage of a main driving mechanism, an auxiliary driving mechanism, a vibratory arm having a pawl thereon, means for vibrating said arm, a ratchet coöperating with the pawl, intermediate mechanism between said ratchet and the note-sheet carriage and intermediate controlling mechanism between said main and auxiliary driving mechanisms for throwing one of said mechanisms into operation when the other is thrown out of operation.

52. The combination with a note-sheet carriage of a main driving mechanism, an auxiliary driving mechanism, a vibratory arm having a pawl thereon, means for vibrating said arm, a ratchet coöperating with the pawl, intermediate mechanism between said ratchet and the note-sheet carriage, shifting means for throwing the pawl out of engagement with the ratchet and intermediate controlling mechanism between said main and auxiliary driving mechanisms for throwing one of said mechanisms into operation when the other is thrown out of operation.

53. The combination with a note-sheet carriage of a main driving mechanism, an auxiliary driving mechanism, a vibratory arm having a pawl thereon, means for vibrating said arm from the auxiliary driving mechanism, a ratchet coöperating with said pawl, intermediate mechanism between said ratchet and the note-sheet carriage, means for locking said ratchet against movement when the vibratory arm is moved in one direction and for unlocking it when the arm is moved in an opposite direction and intermediate controlling mechanism between said main and auxiliary driving mechanisms for throwing one of said mechanisms into operation when the other is thrown out of operation.

54. The combination with a note-sheet carriage of a main driving mechanism, an auxiliary driving mechanism, a vibratory arm having a pawl thereon, means for vibrating said pawl from the auxiliary driving mechanism, a ratchet coöperating with the pawl, intermediate mechanism between said ratchet and the note-sheet carriage, shifting means for throwing the pawl out of engagement with the ratchet, means for locking said ratchet against movement when the vibratory arm is moved in one direction and for unlocking it when the arm is moved in an opposite direction and intermediate controlling mechanism between said main and auxiliary driving mechanisms for throwing one of said mechanisms into operation when the other is thrown out of operation.

55. The combination of a main driving mechanism, an auxiliary driving mechanism, controlling-levers 75 and 82 controlled by said auxiliary driving mechanism and themselves controlling the governor of said auxiliary driving mechanism, a controlling-lever 85 controlled by the main driving mechanism, the said lever itself controlling the governor of said main driving mechanism and a connection between one of the first-named controlling-levers and the controlling-lever 85, substantially as and for the purposes specified.

56. The combination of a main driving mechanism, an auxiliary driving mechanism, controlling-levers 75 and 82 controlled by said auxiliary driving mechanism and themselves controlling the governor of said auxiliary driving mechanism, a starting-lever adapted to operate one of said controlling-levers, a controlling-lever 85 controlled by the main driving mechanism, the said lever itself controlling the governor of the said main driving mechanism and a connection between one of the first-named controlling-levers and the controlling-lever 85, substantially as and for the purposes specified.

57. The combination of a main driving mechanism, an auxiliary driving mechanism, controlling-levers 75 and 82 controlled by said auxiliary driving mechanism and themselves controlling the governor of said auxiliary driving mechanism, a controlling-lever 85 controlled by said main driving mechanism, the said lever itself controlling the governor of said main driving mechanism, a connection between one of the first-named controlling-levers and the lever 85 and means for automatically shifting the tension first upon a controlling-lever for the auxiliary driving mechanism and then upon the controlling-lever of the main driving mechanism.

58. The combination of a main driving mechanism, an auxiliary driving mechanism, controlling-levers 75 and 82 controlled by said auxiliary driving mechanism and themselves controlling the governor of said auxiliary driving mechanism, a starting-lever adapted to operate one of said controlling-levers, a controlling-lever 85 controlled by the main driving mechanism, the said lever itself controlling the governor of said main driving mechanism, a connection between one of said first-named levers and the lever 85 and means for automatically shifting the tension first upon the controlling-lever 82 for the auxiliary driving mechanism and then upon the controlling-lever of the main driving mechanism.

59. The combination of a main driving mechanism, an auxiliary driving mechanism, means operated by said auxiliary driving mechanism for moving a note-sheet carriage; for conveying a note-sheet to operative position in the instrument; for clamping the note-sheet in the operative position and intermediate mechanism between the main and auxiliary driving mechanisms for throwing one of said mechanisms into operation when the other is thrown out of operation.

60. The combination of a main driving mechanism, an auxiliary driving mechanism, a note-sheet carriage moved by said auxiliary driving mechanism, means operated by said auxiliary driving mechanism for conveying a note-sheet to operative position in the instrument, means operated by said auxiliary driving mechanism for clamping the note-sheet in operative position, mechanism for throwing the note-sheet-clamping means into and out of operation, automatic locking mechanism for automatically locking the carriage, said locking means being operated by the auxiliary driving mechanism and intermediate controlling mechanism between said main and auxiliary driving mechanisms for throwing one of said mechanisms into operation when the other is thrown out of operation.

61. The combination of a note-disk, a movable pivot around which said note-disk rotates and means for automatically inserting said pivot in a central bearing in said note-disk.

62. The combination of a note-disk, a movable pivot around which said note-disk rotates, means for automatically inserting said pivot in a central bearing in said note-disk and means for clamping the note-disk on the pivot.

63. The combination of a note-disk, a movable pivot around which said note-disk rotates, means for automatically inserting said pivot in a central bearing in said note-disk and means for automatically clamping the note-disk on the pivot and for automatically releasing the clamping means after the note-disk has been rotated.

64. The combination of a note-disk, means for automatically feeding the note-disk to and from operative position in the instrument, a movable pivot around which said note-disk rotates, means for automatically inserting said pivot in a central bearing in said note-disk and means for automatically clamping the note-disk on the pivot and for automatically releasing the clamping means after the note-disk has been rotated.

65. The combination of a note-disk, a movable pivot around which said note-disk rotates, a clamping-rod and means for moving said pivot and clamping-rod in opposite directions, whereby a movement of the clamping-rod and pivot toward each other will cause the pivot to be inserted in a central bearing in the note-disk and the note-disk to be clamped in position on the pivot.

66. The combination of a note-disk, means for automatically feeding the note-disk to and from operative position in the instrument, a movable pivot around which said note-disk rotates, a clamping-rod and means for automatically moving said pivot and clamping-rod in opposite directions, whereby a movement of the clamping-rod and pivot toward each other will cause the pivot to be inserted in the central bearing in the note-disk and the note-disk to be clamped in position on the pivot.

The foregoing specification of my improvements in automatic musical instruments signed by me this 29th day of March, 1897.

GUSTAV A. BRACHHAUSEN.

Witnesses:
   CHARLES E. SMITH,
   HARRY M. TURK.